United States Patent
van der Griendt

[19]

[11] Patent Number: 6,161,677
[45] Date of Patent: Dec. 19, 2000

[54] TUBE LOADING SYSTEM

[75] Inventor: Pieter S. van der Griendt, Far Hills, N.J.

[73] Assignee: Polytype America Corporation, Mahwah, N.J.

[21] Appl. No.: 09/151,458

[22] Filed: Sep. 10, 1998

[51] Int. Cl.[7] .................................................. B65G 47/90
[52] U.S. Cl. ..................... 198/487.1; 198/689.1; 198/457.03
[58] Field of Search ............. 198/689.1, 602, 198/377.08, 470.1, 471.1, 487.1, 457.03, 803.12

[56] References Cited

U.S. PATENT DOCUMENTS

| | | |
|---|---|---|
| 3,655,026 | 4/1972 | Hirn . |
| 3,760,453 | 9/1973 | Neumann . |
| 3,958,683 | 5/1976 | Schregenberger ..................... 198/22 R |
| 4,138,941 | 2/1979 | McMillin et al. ......................... 101/40 |
| 4,274,532 | 6/1981 | Johnson ................................... 198/429 |
| 4,388,990 | 6/1983 | Michalik . |
| 4,435,114 | 3/1984 | Fardin . |
| 5,523,101 | 6/1996 | Fitch, Jr. . |
| 5,531,312 | 7/1996 | Dickey .................................... 198/450 |
| 5,564,334 | 10/1996 | Burke . |
| 5,634,764 | 6/1997 | Replogle . |
| 5,697,606 | 12/1997 | Maass ...................................... 271/197 |
| 5,699,707 | 12/1997 | Campbell, Jr. . |
| 5,725,082 | 3/1998 | Connell ................................. 198/471.1 |
| 5,762,794 | 6/1998 | Simkowski et al. ..................... 210/398 |
| 5,857,829 | 1/1999 | Achelpohl ............................ 414/797.3 |
| 5,931,278 | 8/1999 | Watanabe ................................ 198/438 |

*Primary Examiner*—Christopher P. Ellis
*Assistant Examiner*—Rashmi Sharma
*Attorney, Agent, or Firm*—Richard M. Goldberg

[57] ABSTRACT

A tube loading system includes an endless vacuum belt wrapped about two rollers; a servo motor for incrementally rotating at least one of the rollers so as to move the vacuum belt; a vacuum plenum in contact with an inner side of the belt and over which the belt rides for applying a vacuum to one side of a portion of the vacuum belt in order to hold a tube having an open end on an opposite side of the portion of the vacuum belt; a source of vacuum fluidly connected to the vacuum plenum; a pin chain having a plurality of pins spaced therealong for receiving the open ends of the tubes thereon, the pin chain being positioned adjacent the vacuum belt and the pins extending in a direction substantially parallel to the portion of the belt such that the open ends of the articles are positioned over the pins; and a conveyor for supplying the tubes in a line one at a time to the portion of the vacuum belt such that each tube is held by the vacuum thereat and as the belt moves, each tube is deposited on a respective pin of the pin chain.

17 Claims, 4 Drawing Sheets

TUBE LOADING SYSTEM

BACKGROUND OF THE INVENTION

The present invention relates generally to tube loading systems, and more particularly, is directed to a tube loading system that eliminates the need for a pocket wheel.

In order to separately load hollow tubes, for example, empty toothpaste tubes having their bottom ends open, the tubes are provided in stacked relation on a conveyor. The tubes travel from the conveyor into a chute which conveys and transfers the tubes to a rotatable pocket wheel. The pocket wheel includes a plurality of pockets or recesses along the outer periphery thereof and all tubes, that are conveyed through the chute are deposited one at a time into a corresponding pocket during rotation thereof.

A pin chain moves adjacent to the pocket wheel and is provided with a plurality of pins. Each pin is aligned with a pocket. Thus, the tubes are deposited in the pockets and then rotated to a position where one or more air jets blow each tube out of the respective pocket and onto a respective pin. The pins are then moved by the chain to another location downstream thereof. The tubes are then stripped by a stripper wheel from the pins and supplied to another pocket wheel and then onto a mandrel for printing on the tubes.

In order to prevent the tubes from falling out of the pockets before they are transferred to a respective pin, a shield surrounds a portion of the pocket wheel.

However, various problems result with this arrangement. Specifically, a new pocket wheel must be provided each time that the diameter of the tubes substantially changes in order to change the dimensions of the pockets which carry the tubes. Thus, there may be a plurality of pocket wheels for an entire line of tubes, The pocket wheels are relatively large and expensive items.

In addition, because the tubes are not filled and are open at one end, they can be relatively flexible. As a result, they tend to become flattened somewhat. In this regard, a tube may deform and be caught between the end of the chute and another tube already in the receiving pocket, which results in jamming and a consequent shut-down of the machine.

There are many variations of the above arrangement. For example, the pocket wheel can be made of axially sliding individual pockets having a vacuum associated therewith, with the pockets axially sliding to move the tubes onto the pin chain. However, there is a mechanical sliding motion for each pocket, rendering the arrangement very complicated in structure and costly, and also suffering the same disadvantages as discussed above.

OBJECTS AND SUMMARY OF THE INVENTION

Accordingly, it is an object of the present invention to provide a tube loading system that overcomes the aforementioned problems.

It is another object of the present invention to provide a tube loading system that uses a vacuum conveyor belt to transport the forwardmost tube from the stack to a pin on a moving pin chain.

It is still another object of the present invention to provide a tube loading system that eliminates the need for a pocket wheel, shield and other interchangeable parts.

It is yet another object of the present invention to provide a tube loading system that is simpler in construction and easier to use than existing systems.

It is a further object of the present invention to provide a tube loading system that is much more reliable than conventional systems.

In accordance with an aspect of the present invention, a tube loading system includes a vacuum belt; a motor drive for moving the vacuum belt; a vacuum applicator for applying a vacuum to one side of a portion of the vacuum belt in order to hold a tube having an open end on an opposite side of the portion of the vacuum belt; a pin chain having a plurality of pins spaced therealong for receiving the open ends of the tubes thereon, the chain being positioned adjacent the vacuum belt; and a delivery device for supplying the tubes in sequence to the portion of the vacuum belt such that each tube is held by the vacuum thereat and as the belt moves, each tube is deposited on a respective pin of the pin chain.

The vacuum belt is an endless belt wrapped about two rollers, and the motor drive includes a servo motor for incrementally rotating at least one of the rollers.

The vacuum applicator includes a vacuum plenum in contact with an inner side of the belt and over which the belt rides, and a source of vacuum fluidly connected to the vacuum plenum. The delivery device includes a conveyor for conveying the tubes in a line one at a time to the belt.

The pins extend in a direction substantially parallel to the portion of the belt such that the open ends of the tubes are positioned over the pins.

In accordance with another aspect of the present invention, a tube loading system includes an endless vacuum belt wrapped about two rollers; a motor for incrementally rotating at least one of the rollers so as to move the vacuum belt; a vacuum applicator for applying a vacuum to one side of a portion of the vacuum belt in order to hold a tube having an open end on an opposite side of the portion of the vacuum belt; a pin chain having a plurality of pins spaced therealong for receiving the open ends of the tubes thereon, the pin chain being positioned adjacent the vacuum belt; and a conveyor for supplying the tubes in a line one at a time to the portion of the vacuum belt such that each tube is held by the vacuum thereat and as the belt moves, each tube is deposited on a respective pin of the pin chain.

The above and other objects, features and advantages of the invention will become readily apparent from the following detailed description thereof which is to be read in connection with the accompanying drawing.

DETAILED DESCRIPTION

Figure 1:
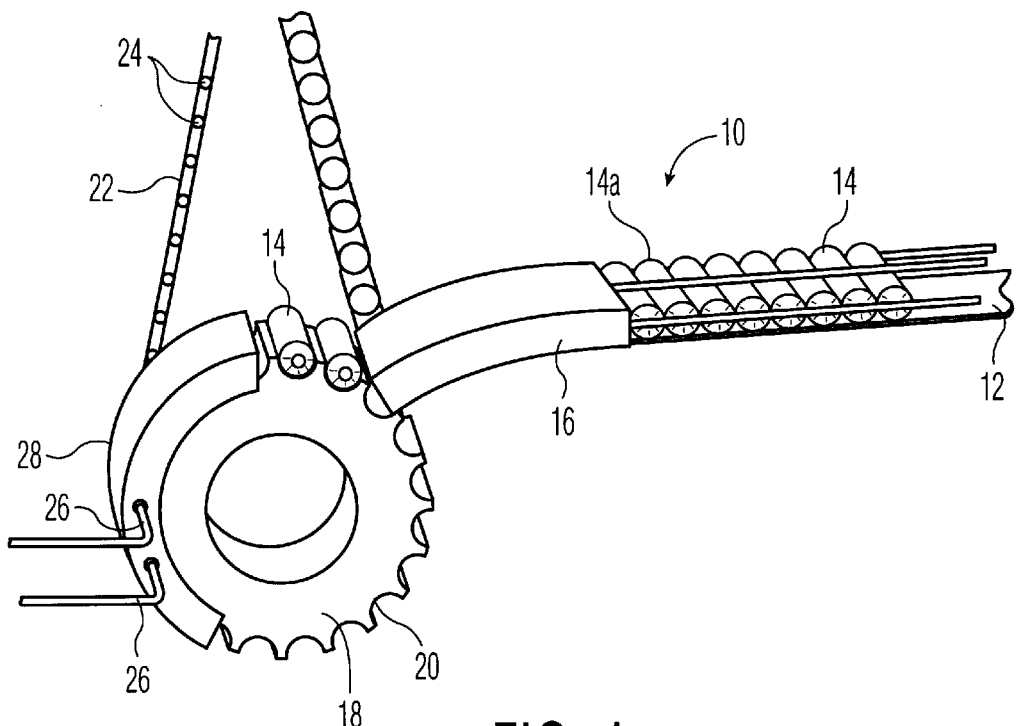
FIG. 1 is a perspective view of a tube loading system according to the prior art.
Figure 3:
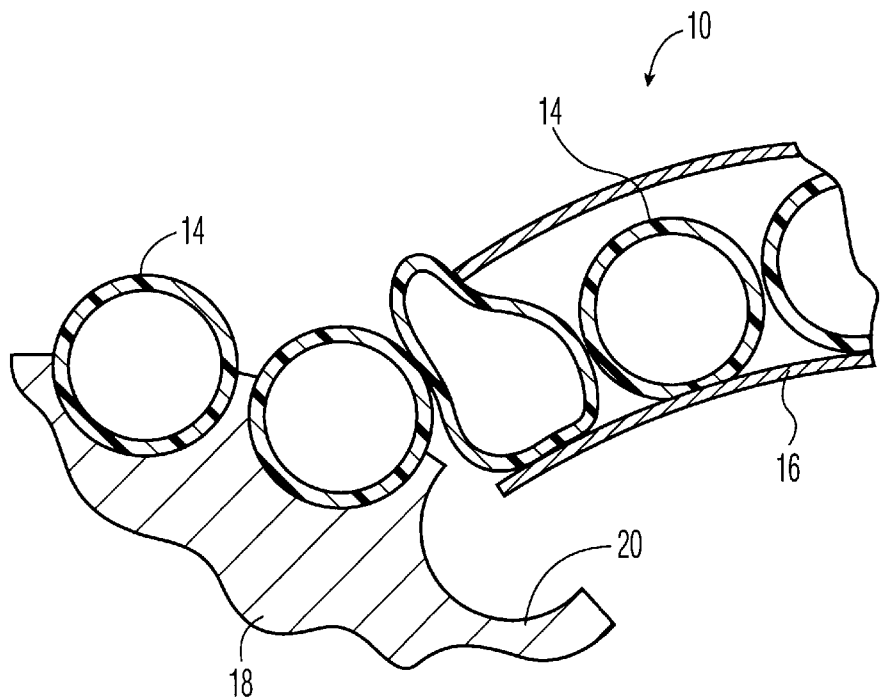
FIG. 3 is an enlarged cross-sectional view of the tube loading system of FIG. 1, showing jamming of the same.
Figure 2:
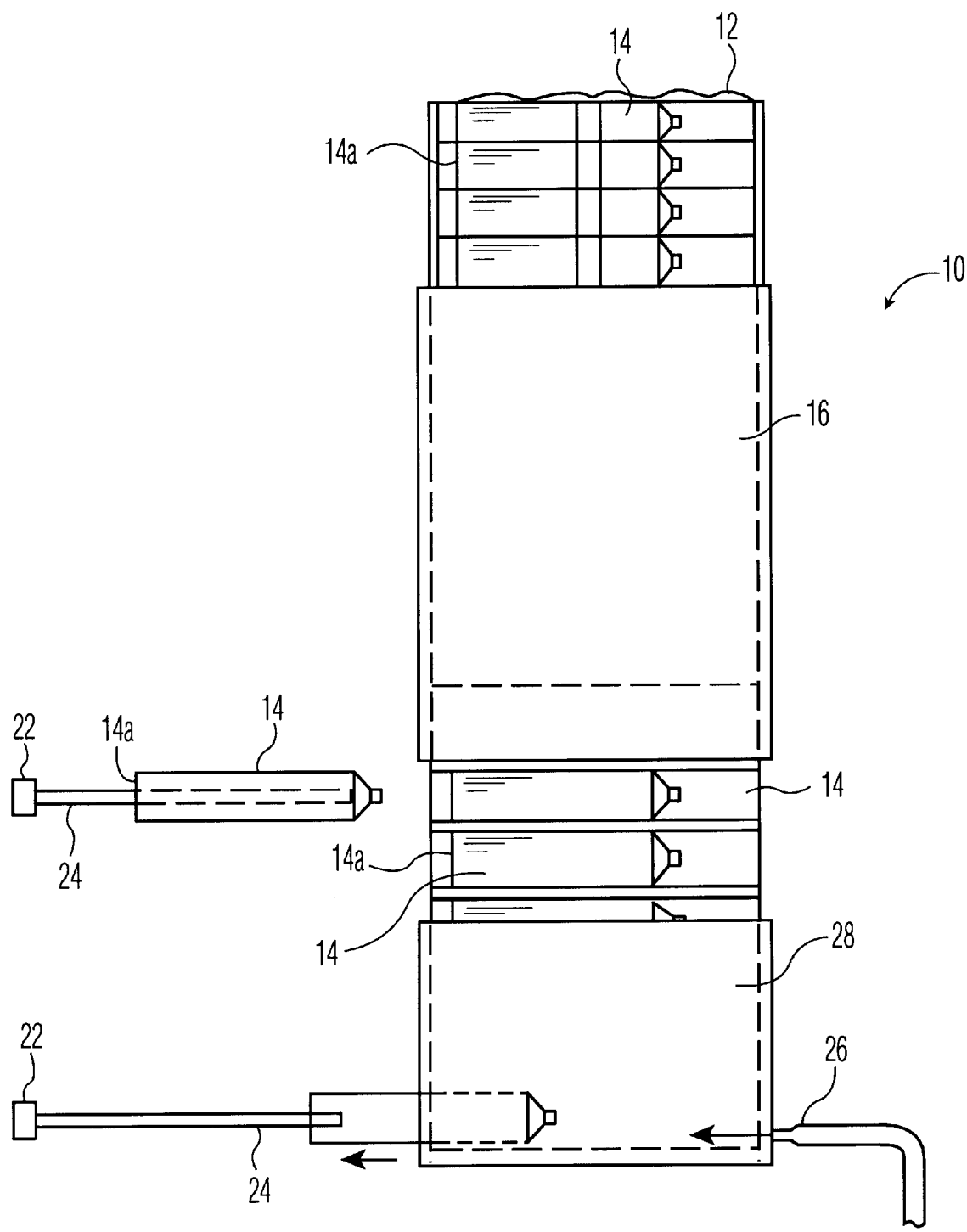
FIG. 2 is a top plan view of the tube loading system of FIG. 1.

Referring initially to FIGS. 1–3, a tube loading system 10 according to the prior art includes a conveyor 12 on which empty tubes 14 having bottom open ends 14a are stacked, that is, in a side by side relation. Tubes 14 travel from conveyor 12 into a chute 16 which conveys tubes and transfers 14 to a rotatable pocket wheel 18. Chute 16 is often eliminated and replaced by guides. Pocket wheel 18 includes a plurality of pockets or recesses 20 along the outer periphery thereof, and all tubes 14 that are conveyed through chute 16 are deposited one at a time into a corresponding pocket 20 during rotation thereof.

A pin chain 22 moves adjacent to pocket wheel 18 and is provided with a plurality of pins 24 spaced evenly therealong and extending therefrom toward respective pockets 20 of pocket wheel 18. Thus, tubes 14 are deposited in pockets 20 and then rotated to a position where one or more air jets 26 blow each tube 14 out of the respective pocket 20 and onto a respective pin 24. Pins 24 are then moved by chain 22 to another location downstream thereof, wherein tubes 14 are then stripped by a stripper wheel (not shown) from pins 24 and supplied to another pocket wheel (not shown) and then onto a mandrel (not shown) for printing on tubes 14.

In order to prevent tubes 14 from falling out of pockets 20 before they are transferred to a respective pin 24, a shield 28 surrounds a portion of pocket wheel 18. Air jets 26 are provided through shield 28.

However, various problems result with this arrangement. Specifically, a new pocket wheel 18 must be provided each time that the diameter of tubes 14 substantially changes in order to change the dimensions of pockets 20 which carry tubes 14. Thus, there may be a plurality of pocket wheels 18 for an entire line of tubes 14, Pocket wheels 18 are relatively large and expensive items.

In addition, because tubes 14 are not filled and are open at one end, they can be relatively flexible. As a result, they tend to become flattened somewhat. In this regard, as shown in FIG. 3, a tube 14 may deform and be caught between the end of chute 16 and another tube 14 already in a receiving pocket 20, which results in jamming and a consequent shut-down of the machine.

The present invention overcomes these problems by eliminating pocket wheel 18 entirely.

Figure 4:
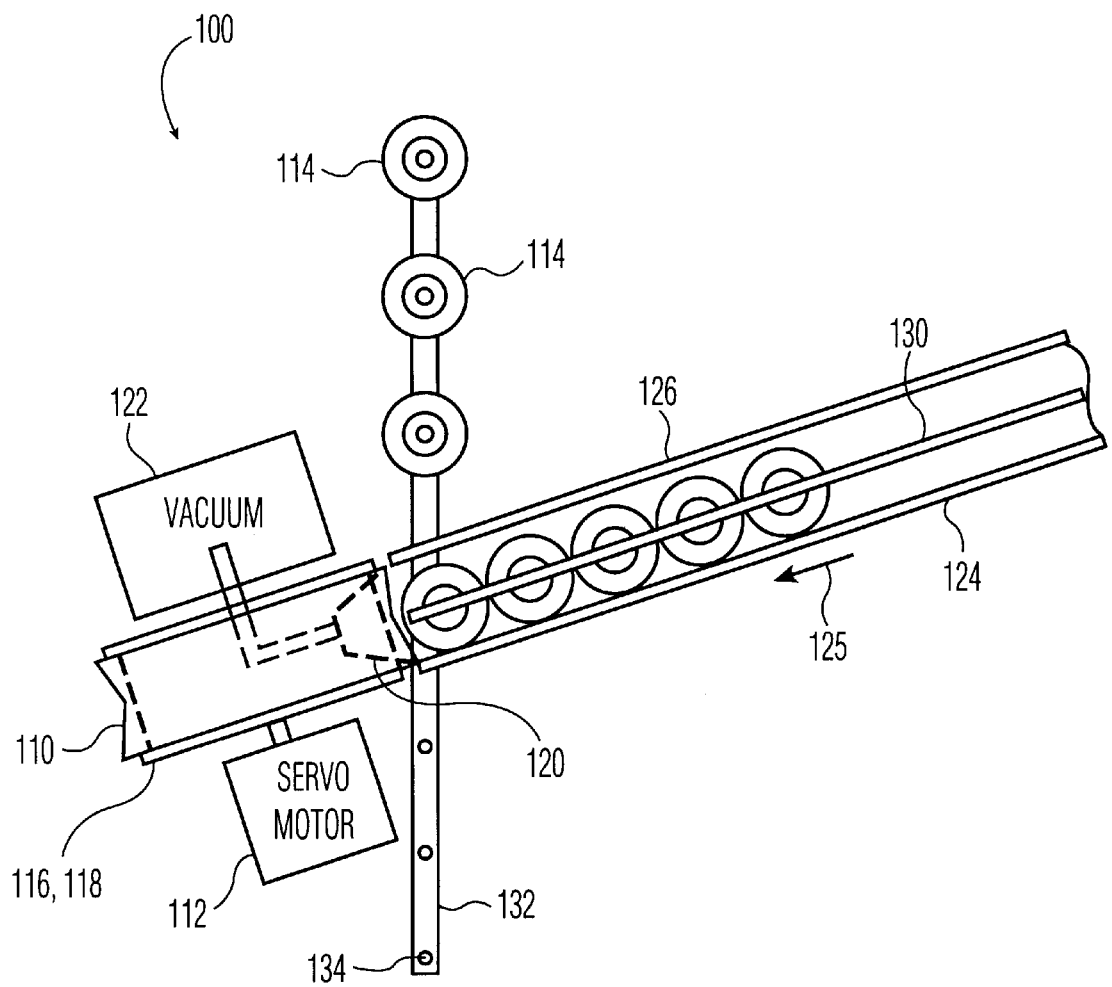
FIG. 4 is an elevational view of a tube loading system according to the present invention.
Figure 5:
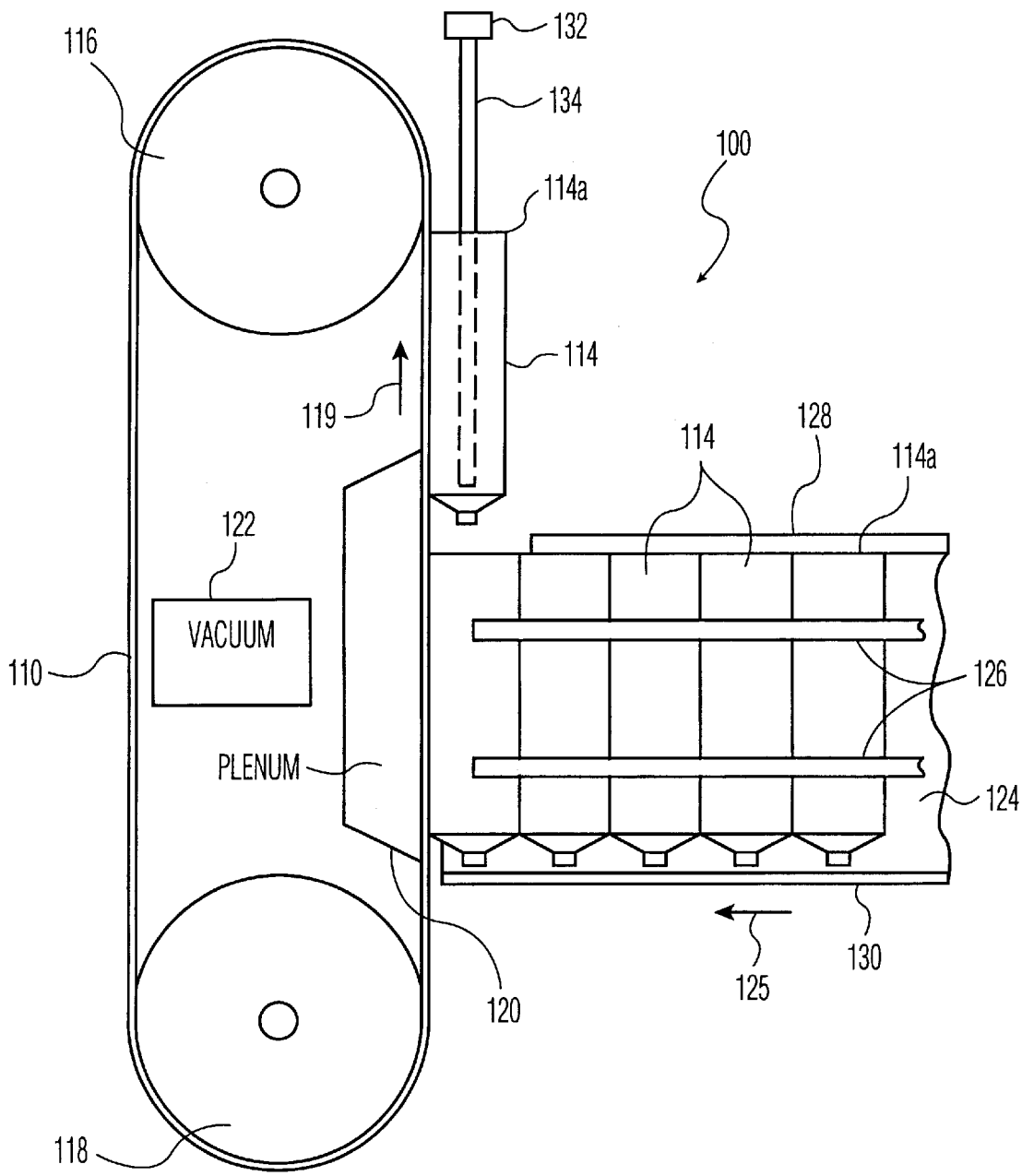
FIG. 5 is a top plan view of the tube loading system of FIG. 4.

Specifically, as shown in FIGS. 4 and 5, a tube loading system 100 according to the present invention includes a vacuum belt 110 which may be a porous belt or a belt with small openings therein, wrapped about two rollers 116 and 118, with one roller 116 being rotated in an incremental manner by a servo motor 112 in the direction of arrow 119. Vacuum belt 110 preferably has a V-shaped outer surface.

A vacuum is placed on the inside surface of belt 110 at a position between rollers 116 and 118 in order to hold a tube 114 on the outer surface of belt 110. In this regard, a vacuum plenum 120 is provided in contact with the inner surface of belt 110 between rollers 116 and 118 and along which belt 110 rides, and is supplied with a vacuum through a vacuum source 122.

Tubes 114 are stacked, that is, in side to side or in line arrangement, on a conveyor or ramp 124 which moves tubes 114 in the direction of arrow 125, and which terminates very close to belt 110 at a position where the vacuum is applied. In order to retain tubes 114 on ramp 124, one or more top guide bars 126 and side guide bars 128 and 130 are provided. It is noted that side guide bar 128 is spaced at least one tube diameter away from belt 110 to permit movement of a tube 114 held by the vacuum on belt 110.

In addition, a pin chain 132 having a plurality of pins 134 spaced therealong, is continuously moved adjacent to roller 116 and belt 110, or moved in an indexed manner. Pins 134 extend in a direction substantially parallel to the portion of belt 110 having the vacuum applied thereto, such that open ends 114a of tubes 114 can be positioned over pins 134. Appropriate known mechanisms can be used for ensuring proper alignment of the pins at positions adjacent vacuum belt 110.

In operation, with belt 110 stopped, a vacuum is applied through vacuum plenum 120 in order to hold one tube 114 on the outer surface of belt 110. Thereafter, servo motor 112 incrementally rotates roller 116, and thereby belt 110, a specified distance, which moves tube 114 onto a pin 134. Tube 114 is held by vacuum on belt 110 even when fully deposited on pin 134 to prevent bounce-back of tube 114 off of pin 134. However, the vacuum force at such time is minimal so as not to interfere with pin 134 taking tube 114 away. At this time, after a tube 114 is loaded on pin 134, servo motor 112 is stopped, the vacuum applied to belt 110 holds the next tube 114 onto belt 110, and when pin chain 132 moves to an appropriate position such that a new pin 134 approaches the loading position, servo motor 112 is again operated to deposit the new tube 114 on the next pin 134. Because the open ends of tubes 114 are of a much larger diameter than pins 134, even if there is a slight variation in the indexing, tubes 114 will still be deposited on pins 134.

As a result, there is no need for any pocket wheel as in the prior art. This means that there is no need to change any pocket wheel or shield.

It will therefore be appreciated that the present invention is applicable for all sizes of tubes 114 without requiring any change in the apparatus. Further, there is no possibility of deformation of tubes 114 which would result in jamming and shut-down of the apparatus as shown in FIG. 3 of the prior art.

It will be appreciated that various modifications can be made to the present invention. For example, instead of servo motor 112 operating incrementally, it is possible to provide continuous rotation of belt 110. As another modification, the vacuum could also be applied incrementally in timed relation with the servo motor operation.

Although the present invention has been discussed in relation to tubes, it is not limited thereto and can be used with any other suitable article, such as sleeves or the like. Thus, in the claims, reference to tubes is intended to cover all similar structures, such as sleeves or other cylindrical articles.

Having described a specific preferred embodiment of the invention with reference to the accompanying drawings, it will be appreciated that the present invention is not limited to that precise embodiment, and that various changes and modifications can be effected therein by one of ordinary skill in the art without departing from the scope or spirit of the invention as defined by the appended claims.

What is claimed is:

1. A tube loading system comprising:
    a various belt;
    a motor drive for moving said vacuum belt;
    a vacuum applicator for applying a vacuum to one side of a portion of said vacuum belt in order to hold a tube having an open end, a lengthwise direction and a side wall on an opposite side of said portion of said vacuum belt;
    a pin chain having a plurality of pins spaced therealong for receiving the open ends of the tubes thereon, said pin chain being positioned adjacent said vacuum belt; and
    a delivery device for supplying said tubes in sequence to said portion of said vacuum belt in a position such that the side wall of each tube is held by said vacuum on said portion of said vacuum belt with the lengthwise direction of each tube being substantially parallel with a moving direction of said vacuum belt and as said belt moves, each said tube is deposited on a respective pin of said pin chain.

2. A tube loading system according to claim 1, wherein said vacuum belt is an endless belt wrapped about two rollers.

3. A tube loading system according to claim 2, wherein said motor drive includes a motor for rotating at least one of said rollers.

4. A tube loading system according to claim 3, wherein said motor includes a servo motor that incrementally rotates said at least one roller.

5. A tube loading system according to claim 1, wherein said vacuum applicator includes a vacuum plenum in contact with an inner side of said belt and over which said belt rides, and a source of vacuum fluidly connected to said vacuum plenum.

6. A tube loading system according to claim 1, wherein said delivery device includes a conveyor for conveying said tubes in a line one at a time to said belt.

7. A tube loading system comprising:

a vacuum belt;

a motor drive for moving said vacuum belt;

a vacuum applicator for applying a vacuum to one side of a portion of said vacuum belt in order to hold a tube having an open end on an opposite side of said portion of said vacuum belt;

a pin chain having a plurality of pins spaced therealong for receiving the open ends of the tubes thereon, said pin chain being positioned adjacent said vacuum belt and said pins extending in a direction substantially parallel to said portion of said belt such that the open ends of said tubes are positioned over said pins; and a delivery device for supplying said tubes in sequence to said portion of said vacuum belt such that each tube is held by said vacuum thereat and as said belt moves, each said tube is deposited on a respective pin of said pin chain.

8. A tube loading system comprising:

a endless vacuum belt wrapped about two rollers;

a motor for incrementally rotating at least one of said rollers so as to move said vacuum belt;

a vacuum applicator for applying a vacuum to one side of a portion of said vacuum belt in order to hold a tube having an open end, a lengthwise direction and a side wall on an opposite side of said portion of said vacuum belt;

a pin chain having a plurality of pins spaced therealong for receiving the open ends of the tubes thereon, said pin chain being positioned adjacent said vacuum belt; and a conveyor for supplying said tubes in a line one at a time to said portion of said vacuum belt in a position such that the side wall of each tube is held by said vacuum on said portion of said vacuum belt with the lengthwise direction of each tube being substantially parallel with a moving direction of said vacuum belt and as said belt moves, each said tube is deposited on a respective pin of said pin chain.

9. A tube loading system according to claim 8, wherein said motor includes a servo motor that incrementally rotates said at least one roller.

10. A tube loading system according to claim 8, wherein said vacuum applicator includes a vacuum plenum in contact with an inner side of said belt and over which said belt rides, and a source of vacuum fluidly connected to said vacuum plenum.

11. A tube loading system comprising:

an endless vacuum belt wrapped about two rollers:

a motor for incrementally rotating at least one of said rollers so as to move said vacuum belt;

a vacuum applicator for applying a vacuum to one side of a portion of said vacuum belt in order to hold a tube having an open end on an opposite side of said portion of said vacuum belt;

a pin chain having a plurality of pins spaced therealong for receiving the open ends of the tubes thereon, said pin chain being positioned adjacent said vacuum belt and said pins extending in a direction substantially parallel to said portion of said belt such that the open ends of said articles are positioned over said pins; and a conveyor for supplying said tubes in a line one at a time to said portion of said vacuum belt such that each tube is held by said vacuum thereat and as said belt moves, each said tube is deposited on a respective pin of said pin chain.

12. A tube loading system comprising:

a vacuum belt has a V-shaped outer surface for engaging tubes thereon;

motor drive for moving said vacuum belt;

a vacuum applicator for applying a vacuum to one side of a portion of said vacuum belt in order to hold a tube having an open end on an opposite side of said portion of said vacuum belt;

a pin chain having a plurality of pins spaced therealong for receiving the open ends of the tubes thereon, said pin chain being positioned adjacent said vacuum belt; and a delivery device for supplying said tubes in sequence to said portion of said vacuum belt such that each tube is held by said vacuum thereat and as said belt moves, each said tube is deposited on a respective pin of said pin chain.

13. A tube loading system according to claim 1, wherein said vacuum belt is porous and through which said vacuum is applied.

14. A tube loading system according to claim 1, wherein said vacuum belt has holes therein through which said vacuum is applied.

15. A tube loading system comprising:

an endless vacuum belt having a V-shaped outer surface for engaging tubes thereon and wrapped about two rollers;

a motor for incrementally rotating at least one of said rollers so as to move said vacuum belt;

a vacuum applicator for applying a vacuum to one side of a portion of said vacuum belt in order to hold a tube having an open end on an opposite side of said portion of said vacuum belt;

a pin chain having a plurality of pins spaced therealong for receiving the open ends of the tubes thereon, said pin chain being positioned adjacent said vacuum belt; and a conveyor for supplying said tubes in a line one at a time to said portion of said vacuum belt such that each tube is held by said vacuum thereat and as said belt moves, each said tube is deposited on a respective pin of said pin chain.

16. A tube loading system according to claim 8, wherein said vacuum belt is porous and through which said vacuum is applied.

17. A tube loading system according to claim 8, wherein said vacuum belt has holes therein through which said vacuum is applied.

* * * * *

UNITED STATES PATENT AND TRADEMARK OFFICE
CERTIFICATE OF CORRECTION

PATENT NO : 6,161,677
DATED : December 19, 2000
INVENTOR(S) : Pieter S. van der Griendt It is certified that error appears in the above-identified patent and that said Letters Patent are hereby corrected as shown below:

Column 4, line 41, change "various" to -- vacuum -- .

Signed and Sealed this

Twenty-ninth Day of May, 2001

Attest:

NICHOLAS P. GODICI

Attesting Officer     Acting Director of the United States Patent and Trademark Office